(12) United States Patent
Ng et al.

(10) Patent No.: US 9,485,696 B2
(45) Date of Patent: Nov. 1, 2016

(54) SYSTEMS, METHODS AND APPARATUS FOR SWITCHING NETWORKS IN ACTIVE MODE

(71) Applicant: QUALCOMM Incorporated, San Diego, CA (US)

(72) Inventors: Alvin Siu-Chung Ng, Hong Kong (HK); Troy Russell Curtiss, Boulder, CO (US); Tak-Wai Wu, Hong Kong (HK); Cheong Tsun Sang, Hong Kong (HK); Chun Chung Patrick Chan, Hong Kong (HK); Chintan Pravin Turakhia, San Diego, CO (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 14/339,274

(22) Filed: Jul. 23, 2014

(65) Prior Publication Data
US 2016/0029274 A1 Jan. 28, 2016

(51) Int. Cl.
*H04W 36/00* (2009.01)
*H04W 36/14* (2009.01)
(Continued)

(52) U.S. Cl.
CPC .......... *H04W 36/14* (2013.01); *H04B 1/3816* (2013.01); *H04M 3/2227* (2013.01); *H04M 7/066* (2013.01); *H04W 36/0083* (2013.01);
(Continued)

(58) Field of Classification Search
CPC .......... H04W 36/0083; H04W 36/14; H04W 36/30; H04W 36/0022; H04W 36/0016; H04W 36/0094; H04W 84/12; H04W 88/06; H04W 36/18; H04W 36/0066; H04W 48/18; H04W 24/10; H04W 36/0055; H04W 36/08; H04W 36/165

USPC ............. 455/436, 437, 411, 438, 552.1, 418, 455/432.1, 434, 435.2, 440, 444; 370/331, 370/332, 252
See application file for complete search history.

(56) References Cited

U.S. PATENT DOCUMENTS

2006/0099952 A1* 5/2006 Prehofer ............... H04W 36/24
455/440
2010/0075665 A1 3/2010 Nader et al.
(Continued)

FOREIGN PATENT DOCUMENTS

WO WO-2007051184 A2 5/2007
WO WO-2013140197 A1 9/2013

OTHER PUBLICATIONS

International Search Report and Written Opinion—PCT/US2015/040186—ISA/EPO—Oct. 16, 2015.

*Primary Examiner* — Fred Casca
(74) *Attorney, Agent, or Firm* — Knobbe Martens Olson & Bear LLP (57) ABSTRACT

Systems, methods, and apparatuses for switching networks in active mode are described herein. In one aspect a method of wireless communication is provided. The method includes communicating with a device over a first network. The method further includes monitoring for a second network during the communication with the device, the second network having a higher throughput than the first network. The method further includes determining an application usage history of the device. The method further includes selectively transitioning the communication from the first network to the second network based on a parameter of the first network, a parameter of the second network, and an application usage history of the device.

22 Claims, 5 Drawing Sheets

(51) Int. Cl.
*H04W 36/30* (2009.01)
*H04W 84/12* (2009.01)
*H04M 3/22* (2006.01)
*H04M 7/06* (2006.01)
*H04B 1/3816* (2015.01)
*H04W 88/06* (2009.01)

(52) U.S. Cl.
CPC ............. *H04W36/30* (2013.01); *H04W 84/12* (2013.01); *H04W 88/06* (2013.01)

(56) References Cited

U.S. PATENT DOCUMENTS

| | | | |
|---|---|---|---|
| 2011/0122784 A1* | 5/2011 | Ananthanarayanan | H04W 4/10 370/252 |
| 2011/0189997 A1* | 8/2011 | Tiwari | H04W 36/26 455/443 |
| 2012/0115552 A1* | 5/2012 | Bhattacharya | H04W 52/0261 455/574 |
| 2013/0208605 A1 | 8/2013 | Bautista et al. | |
| 2013/0215846 A1 | 8/2013 | Yerrabommanahalli et al. | |
| 2013/0267267 A1 | 10/2013 | Mujtaba et al. | |
| 2013/0294301 A1* | 11/2013 | Bitton | H04B 7/0691 370/297 |
| 2013/0303170 A1 | 11/2013 | Siomina et al. | |
| 2013/0344873 A1 | 12/2013 | Sane et al. | |
| 2014/0086209 A1* | 3/2014 | Su | H04W 74/02 370/331 |
| 2015/0092673 A1* | 4/2015 | Singh | H04W 28/0215 370/329 |
| 2015/0208306 A1* | 7/2015 | Kotecha | H04W 36/14 455/436 |
| 2016/0050571 A1* | 2/2016 | Zhuang | H04W 24/02 370/254 |

* cited by examiner

SYSTEMS, METHODS AND APPARATUS FOR SWITCHING NETWORKS IN ACTIVE MODE

BACKGROUND

1. Field

The present application relates generally to wireless communications, and more specifically to systems, methods, and apparatus for switching between networks in active mode.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc. These systems may be accessed by various types of access terminals adapted to facilitate wireless communications, where multiple access terminals share the available system resources (e.g., time, frequency, and power).

A subscriber identity module (SIM) is an integrated circuit, or in some cases, an application that runs on a universal integrated circuit card (UICC), used on a mobile device such as a mobile phone or a computer to store the international mobile subscriber identity (IMSI) and the related key used to identify and authenticate subscribers on mobile devices. A dual SIM mobile phone is one which holds two SIM cards (or runs two SIM applications), and allows the use of two services or subscriptions on a single mobile device. Mobile devices having dual SIM capability allow both SIMS to be active simultaneously and allow calls to be received on either number at any given time. Dual SIM Dual Standby (DSDS) is a technology that operates both SIMS simultaneously but shares only one transceiver between them.

As the demand for mobile broadband access continues to increase, research and development continue to advance the technology not only to meet the growing demand for mobile broadband access, but to advance and enhance the user experience with mobile communications.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In one implementation, an apparatus for wireless communication is provided. The apparatus includes a first antenna configured to communicate with a device over a first network. The apparatus further includes a second antenna configured to monitor for a second network during the communication with the device, the second network having a higher throughput than the first network. The apparatus further includes a processor coupled to the first antenna and the second antenna, the processor configured to determine an application usage history of the device and selectively transition the communication from the first network to the second network based on a parameter of the first network, a parameter of the second network, and an application usage history of the device.

In another implementation, a method for wireless communication is provided. The method includes communicating with a device over a first network. The method further includes monitoring for a second network during the communication with the device, the second network having a higher throughput than the first network. The method further includes determining an application usage history of the device. The method further includes selectively transitioning the communication from the first network to the second network based on a parameter of the first network, a parameter of the second network, and an application usage history of the device.

In yet another implementation, an apparatus for wireless communication is provided. The apparatus includes means for communicating with a device over a first network. The apparatus further includes means for monitoring for a second network during the communication with the device, the second network having a higher throughput than the first network. The apparatus further includes means for determining an application usage history of the device. The apparatus further includes means for selectively transitioning the communication from the first network to the second network based on a parameter of the first network, a parameter of the second network, and an application usage history of the device.

In yet another implementation, a non-transitory computer-readable medium is presented. The non-transitory computer-readable medium comprises code that, when executed, causes an apparatus to communicate with a device over a first network. The non-transitory computer-readable medium further comprises code that, when executed, causes an apparatus to monitor for a second network during the communication with the device, the second network having a higher throughput than the first network. The non-transitory computer-readable medium further comprises code that, when executed, causes an apparatus to determine an application usage history of the device and selectively transition the communication from the first network to the second network based on a parameter of the first network, a parameter of the second network, and an application usage history of the device.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

It should be emphasized that the disclosed techniques may also be applicable to technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

Figure 1:
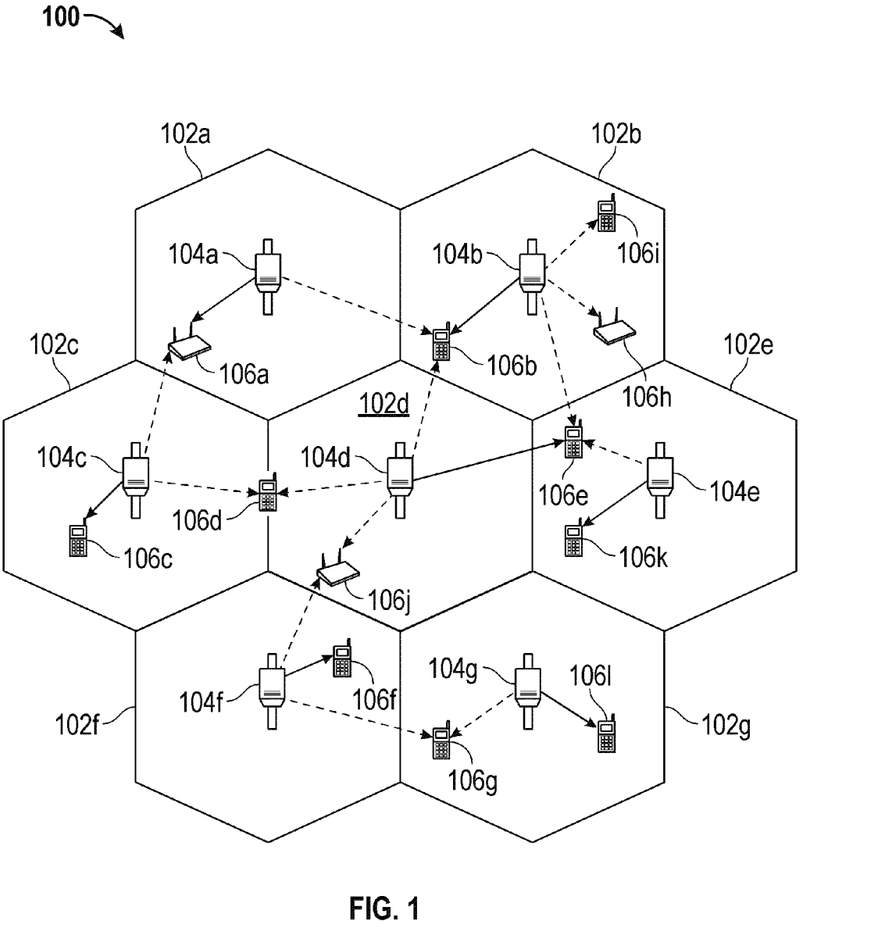
FIG. 1 illustrates an example of a wireless communication network in which aspects of the present disclosure may be employed.

FIG. 1 illustrates an example of a wireless communication network or system environment 100 in which aspects of the present disclosure may be employed. FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102*a*-102*g*. Communication coverage in cells 102*a*-102*g* may be provided by one or more nodes 104 (e.g., base stations or access points), such as, for example, nodes 104*a*-104*g*. Each node 104 may provide communication coverage to a corresponding cell 102. The nodes 104 may interact with a plurality of access terminals (ATs), such as, for example, ATs 106*a*-106*l*. For ease of reference, ATs 106*a*-106*l* may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, or any other suitable device that is configured to communicate via a wireless medium) used by a user to send and receive voice or data over a communications network. An access terminal (AT) 106 may also be referred to herein as a user equipment (UE), as a station (STA), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as CDMA2000 1x, 1x-evolution data optimized (EVDO), LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

In an embodiment, the AT 106 may collect communication statistics. Communication statistics may include, for example, information about applications that attempt to access the RATs, when the applications attempt to access the radio channels RATs, what kind of access is attempted, usage history of applications, etc.

Figure 2:
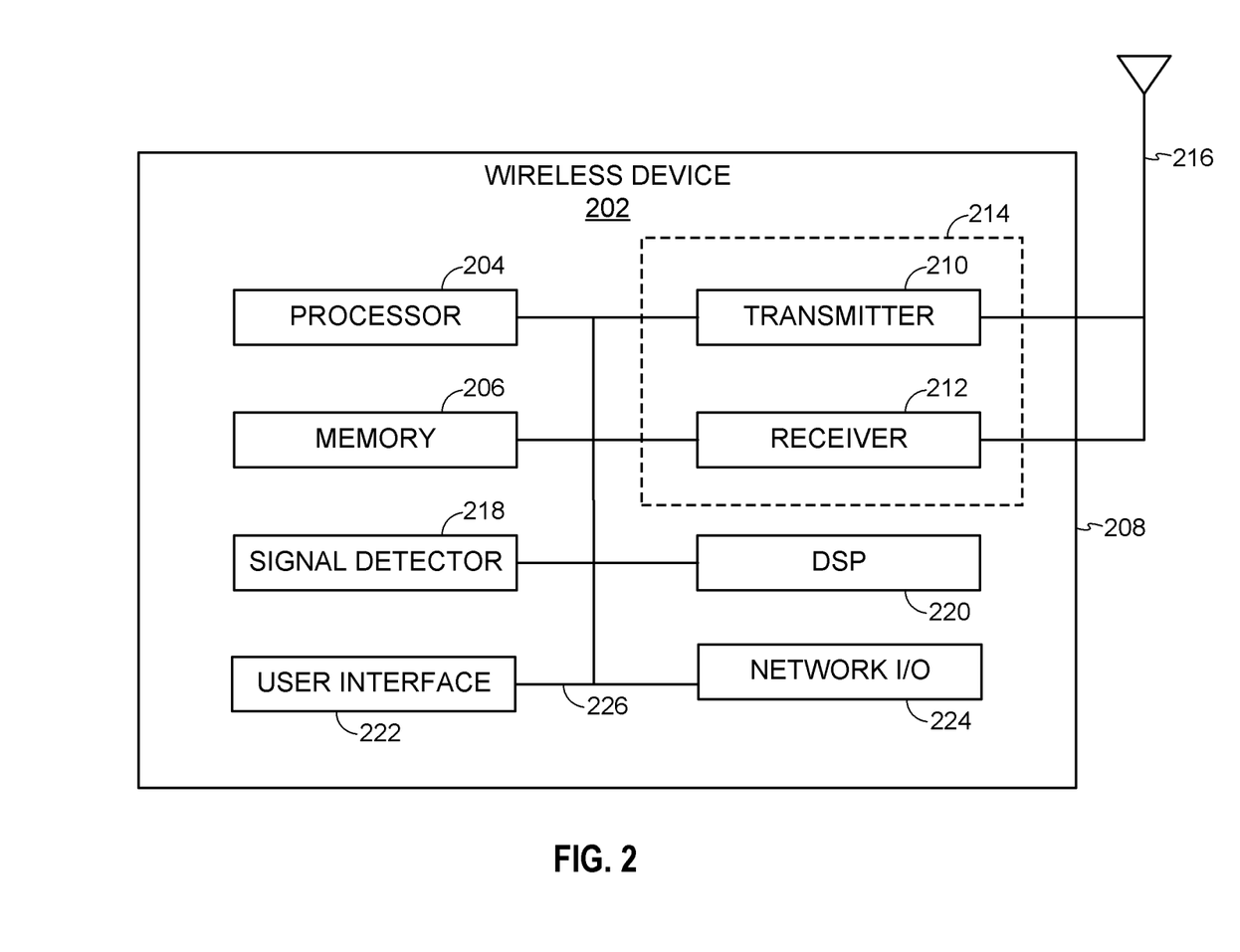
FIG. 2 illustrates an example of a functional block diagram of a wireless device that may be employed within the wireless communication network of FIG. 1.

FIG. 2 illustrates an example of a functional block diagram of a wireless device that may be employed within the wireless communication network of FIG. 1. The wireless device 202 is an example of a device that may be configured to implement the various methods described herein. For example, the wireless device 202 can comprise the AT 106 or node 104 of FIG. 1. The wireless device 202 may be a multimode or multiband device, capable of operating using different radio access technologies (RATs), such as but not limited to LTE, LTE Advanced, HSPA, CDMA, HRPD, eHRPD, CDMA2000, GSM, GPRS, EDGE, UMTS, or the like.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The data in memory 206 may include configuration data. Configuration data may be preloaded into the memory 206. Configuration data may be obtained from a user of the wireless device 202 (e.g., through an interface 222, SIM card, download, over the air). The processor 204 may perform logical and arithmetic operations further based on the configuration data.

In some aspects, the processor 204 is configured to cause signals to be sent and to receive signals from another device (e.g., nodes 104 and/or ATs 106). The signals may include information indicating which network service may be utilized depending at least in part on a load on one or more of the networks. The processor 204 may be further configured to enforce any access permissions to one or both of the cellular network or the WLAN.

In some implementations, a network input/output (I/O) module 224 is provided. The network I/O module 224 may be configured to send and receive signals to and from network components (e.g., the nodes 104 and/or ATs 106). In some implementations, this may be referred to as backhaul signaling.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that includes the transmitter 210 and/or the receiver 212 to allow transmission and reception of data between the wireless device 202 and a remote location. The transmitter 210 may be configured to wirelessly transmit status information. Further, the receiver 212 may be configured to wirelessly receive user data. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission and/or process a received packet.

In some aspects, the wireless device 202 may further comprise a user interface 222. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. For example, the processor 204 and the memory 206 may be embodied on a single chip. The processor 204 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the terms "circuit" and "circuitry" are construed as a structural terms and not as functional terms. For example, circuitry can be an aggregate of circuit components, such as a multiplicity of integrated circuit components, in the form of processing and/or memory cells, units, blocks, and the like, such as shown and described in FIG. 2. One or more of the functional blocks and/or one or more combinations of the functional blocks described with respect to the wireless device 202 may also be implemented as a combination of computing devices, e.g., a combination of a DSP and a microprocessor, a plurality of microprocessors, one or more microprocessor in conjunction with a DSP communication, or any other such configuration.

In some embodiments, if a AT 106 originates a data call on a first network (e.g., 1×, high rate packet data (HRPD), or enhanced high rate packet data (eHRPD)) in an area where a second network (e.g., LTE) coverage does not exist and then later moves back to an area with sufficient coverage for the second network, the AT 106 will continue staying on first network until the channel is released. In some embodiments, the first network is a CDMA2000 1×, 1×-evolution data optimized (EVDO), eHRPD, 2G, 3G, 4G, LTE, LTE advanced, or similar network. In some embodiments, the second network is a later developed RAT compared to the first network. In the first network, the user may experience network speeds slower than the second network. The user experience could be improved if the AT 106 can switch to the second network if the second network coverage is available and sufficient. Certain embodiments described herein relate to switching to the second network coverage when the first network is in active mode. In some embodiments, the second network coverage may have priority over the first network.

Figure 3:
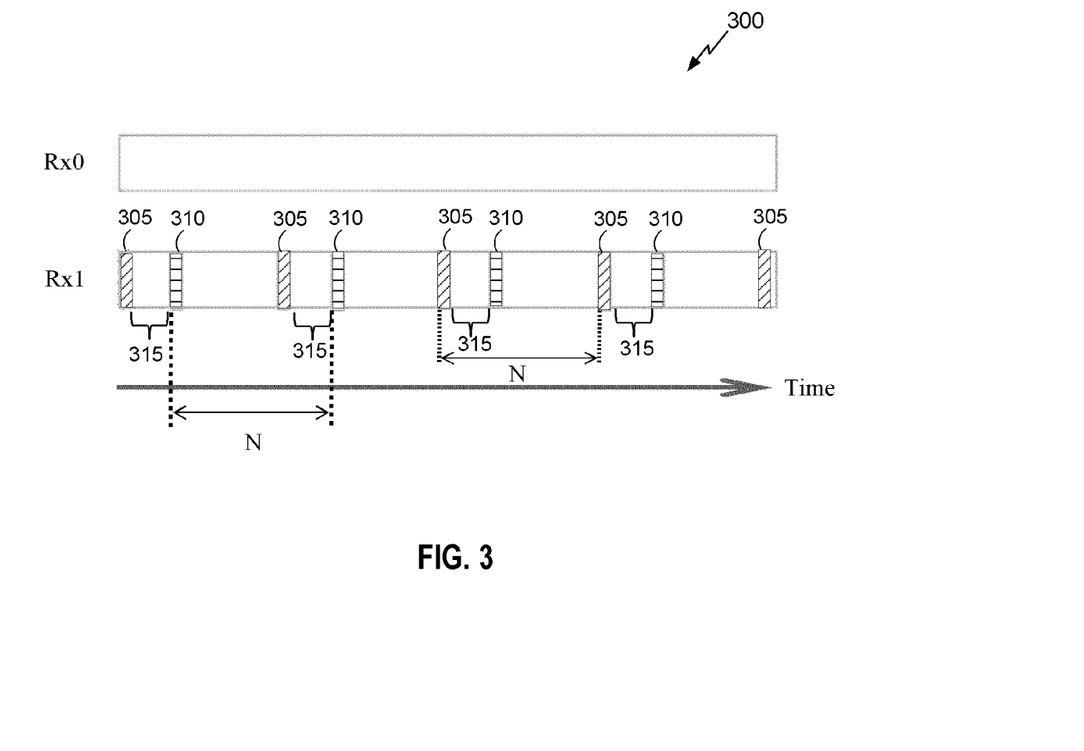
FIG. 3 is a time sequence diagram illustrating a wireless device with multiple antennas on an earlier technology data call and performing LTE tune away with periodicity N.

In some embodiments, the AT 106 may have intelligence to check for an available second network while the AT 106 is in an active first network data call. FIG. 3 is a time sequence diagram illustrating a wireless device (e.g., AT 106 or device 202) with multiple antennas. The wireless device may be on a first network data call (e.g., EVDO or 1×) and perform a second network (e.g., LTE) tune away during the call. As shown in FIG. 3, the antenna $R_x0$ is on a first network data call and the antenna $R_x1$ periodically performs a tune away to the 1× network at times 305. The AT 106 tunes away to the 1× network to perform various 1× maintenance such as, acquiring a 1× cell, monitor the paging channel, or receiving 1× pages. In some aspects, the AT 106 can also use the $R_x1$ antenna to search for an available second network. To avoid collision with the periodic 1× tune away, the AT 106 can start the second network tune away right after 1× tune away is returned or by a fixed time offset 315 to the 1× tune away. As shown, the 1× tune away occurs at times 305 with period N seconds and the second network tune away occurs at times 310 with period N seconds and fixed offset 315.

Figure 4:
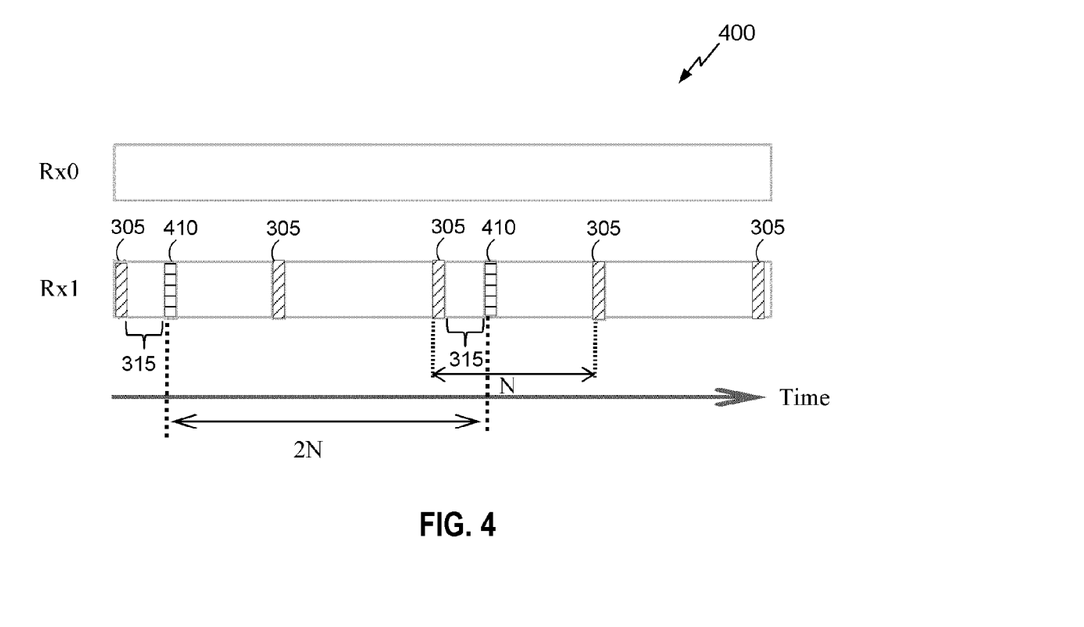
FIG. 4 is a time sequence diagram illustrating a wireless device with multiple antennas on an earlier technology data call and performing LTE tune away with periodicity 2N.

In some embodiments, the periodicity of the second network tune away may be configurable based on a variable time offset or on a multiple of slot cycles/periods. For example, the offset from the 1× tune away may be variable for each period N (e.g., 1.28 s, 2.56 s, 3.84 s, 5.12 s, etc.). FIG. 4 is a time sequence diagram illustrating a wireless device (e.g., AT 106 or device 202) with multiple antennas. The wireless device may be on a first network (e.g., EVDO or 1×) data call and perform a second network (e.g., LTE) tune away with period 2N seconds during the call. In this embodiment, the 1× tune away occurs at times 305. The second network tune away still occurs with fixed offset 315, but the second network tune away now occurs every other slot cycle index (SCI) or every 2N seconds at times 410.

In addition to the second network tune away periodicity discussed above, the second network tune away periodicity can be further adjusted based on the current technology (e.g., the first network) being latched on. For example, a new periodicity for the second network tune away may be computed according to the following equation: $Periodicity_{(new)} = Freq_{(low|mid|high)} * Periodicity_{(current)}$. Wherein the relationship of $Freq_{Low}$, $Freq_{Mid}$ and $Freq_{High}$ is given by the equation: $Freq_{high} > Freq_{mid} > Freq_{low}$. In some embodiments, if the AT 106 is currently on a 1× data call, it may be desirable for the AT 106 to look for a second network with higher frequency. A parameter $Freq_{Low}$ is defined for the second network tune-away frequency which may decrease the $Periodicity_{(new)}$ compared to $Periodicity_{(current)}$ and decrease the time between the second network tune aways. If the AT 106 is currently on EVDO Rev 0, EVDO Rev A or single carrier EVDO Rev B data call, the second network tune away time can be less frequent than when AT 106 is on a 1× data call. A second parameter $Freq_{mid}$ is defined for the second network tune-away frequency. If the AT 106 is currently on multi-carriers EVDO Rev B, the second network tune away time may be less frequent than with 1×, or other EVDO calls. A third parameter $Freq_{High}$ is defined for the second network tune-away frequency which may increase the $Periodicity_{(new)}$ compared to $Periodicity_{(current)}$ and increase the time between second network tune aways.

Another way the second network tune away periodicity can be adjusted is based on the signal strength history of the second network technology (e.g., LTE). In some embodiments, the AT 106 may maintain a filter average of past signal strength of the second network technology. In some aspects, the AT 106 will only perform a second network tune away if the filter average of past signal strength of the second network technology is above a certain threshold.

Another way the second network tune away periodicity can be adjusted is based on the remaining battery level of the AT 106. In some embodiments, the AT 106 may attempt to preserve battery by only performing second network tune aways when there is sufficient battery power. In these embodiments, the AT 106 may stop performing second network tune aways when the battery level is below a certain threshold. If the battery level is above the threshold, the AT 106 may perform second network tune aways.

Another way the second network tune away periodicity can be adjusted is based on the size of the multimode system selection (MMSS) preferred roaming list (PRL). In some aspects, a full second network scan may not be desirable if the MMSS PRL is large. The AT 106 may instead only scan certain bands, frequencies. The selected scanning may minimize the impact on the battery. The band/frequency/network to be searched, may be based on the MMSS PRL (ePRL) provisioned in the AT 106.

Another way the second network tune away periodicity can be adjusted is based on which antenna chain is used for the second network tune away. In some embodiments, the AT 106 may use the secondary chain, Rx1. The AT 106, may also employ a scheme that uses the primary chain, $R_x0$, and the secondary chain, $R_x1$, alternately. Additionally, the AT 106 may use the primary chain ($R_x0$) for the second network tune away while in connected mode instead of the secondary chain under the certain conditions. For example, the AT 106 may use the primary chain for the second network tune away when the secondary chain power is very low, e.g., below a threshold and/or when an antenna imbalance is detected between the primary chain and secondary chain, e.g., the received signal difference is greater than a threshold.

Each of the second network tune away adjustments described above may be used in combination or individually to adjust the frequency/periodicity of the second network tune away. After tuning away to the second network, the AT 106 may gather certain information about the second network and then decide whether or not to switch from the current first network to the second network.

When deciding to switch to the second network, the AT 106 may have certain criteria to ensure the second network coverage is sufficient or desirable. In some aspects, the AT 106 may determine it is desirable to switch to the second network (e.g., LTE) when the signal strength of the second network is above a certain threshold or stays above a threshold for a certain period of time. In some embodiments, the AT 106 determines the signal strength during the second network tune away by taking a measurement of the signal strength (reference signal received power (RSRP)/reference signal received quality (RSRQ)/received signal strength indicator (RSSI)/etc.). Also, the AT 106 may measure the evolved universal terrestrial radio access (E-UTRA) neighbors quality defined in a OtherRATNeighborList Message to minimize the time on the active first network call.

One criteria the AT 106 may use when deciding to switch networks is the application usage history of the first network. In some embodiments, the AT 106 may record levels of in-service application usage history and base its decision at least in part on the level of in-service application usage. In some aspects, the AT 106 may establish one or more thresholds based on the in-service application usage history. For example, the AT 106 may have a threshold, $Usage_{high}$, when the application usage is high (e.g., audio/video streaming or heavy file transfer protocol (FTP) history). The AT 106 may also have a threshold, $Usage_{mid}$, when the application usage is lower than the high threshold (e.g., HTTP-based web browsing). The AT 106 may also have a threshold, $Usage_{low}$, when the application usage is low (e.g., chatty applications such as Twitter, QChat, WhatsApp). In some embodiments, when the AT 106 is on a 1× or 2G data call and the AT 106 re-enters a second network coverage area, the switch to the second network may proceed immediately if the in-service application history is above $Usage_{low}$. In other embodiments, if the AT 106 is on a EVDO Rev 0, EVDO Rev A, single carrier EVDO Rev B or similar technology, a switch to the second network may proceed immediately if the in-service application usage history is above $Usage_{mid}$. In some aspects, if the AT 106 is on multi-carriers EVDO Rev B or another similar technology, a switch to the second network may proceed immediately if the in-service application usage history is above $Usage_{high}$. In some embodiments, switch to second network may occur at lower or higher threshold levels and there may be more or fewer threshold values for determining the switch.

Another criteria the AT 106 may use when deciding to switch networks is the load of the respective networks. For example, while on a first network (e.g., EVDO) data call the AT 106 may measure the load of the second network (e.g., LTE) to determine whether switching networks is desirable. In some aspects, if the second network has a very heavy traffic load, the AT 106 may delay switching to the second network until the load lessens. In other aspects, if the second network has a light traffic load, then the AT 106 may proceed to switch immediately to the second network.

Another criteria the AT 106 may use when deciding to switch networks is the current technology of the active data call. In some embodiments, the earlier the first network technology, the faster the AT 106 will switch to the second network or later developed technology network. For example, AT 106 may determine three thresholds $TH_{low}$, $TH_{mid}$, $TH_{high}$. In some embodiments, the relationship among $TH_{low}$, $TH_{mid}$, and $TH_{high}$ is: $TH_{high} > TH_{mid} > TH_{low}$. In some aspects, there may be fewer or more thresholds. In some embodiments, if the AT 106 is on a 2G network, a switch to the second network may proceed if the measured signal strength of target technology (LTE) has been above a threshold, $TH_{low}$. In some embodiments, if the AT 106 is on EVDO Rev 0, EVDO Rev A, or single carrier EVDO Rev B, a switch to the second network may proceed if the measured signal strength of second network technology (e.g., LTE) has been above a threshold, $TH_{mid}$. In some embodiments, if the AT 106 is on multi-carriers EVDO Rev B, a switch to the second network may proceed if the measured signal strength of second network technology (e.g., LTE) has been above a threshold, $TH_{high}$.

Another criteria the AT 106 may use when deciding to switch networks is the hypothetical throughput of the second network technology (e.g., LTE). In some embodiments, the AT 106 may estimate the hypothetical throughput based on a measured signal strength (e.g., signal-to-interference-plus-noise ratio (SINR)). In other embodiments, the AT 106 may estimate the hypothetical throughput based on a measured SINR, a SINR to Data Rate mapping table, and a serving probability by the second network. In some aspects, if the estimated hypothetical throughput of the second network is above a certain threshold, then the AT 106 may proceed to switch from the first network to the second network technology (e.g., LTE).

The AT 106 may use any of the above criteria in combination or individually to determine when to switch networks.

In some embodiments, it may be desirable for the AT 106 to switch from the second network to the first network. In some embodiments, the second network is an LTE or later developed technology network and the first network is a 1×, EVDO, 3G, or other earlier technology network. For example, in some aspects, some communications (e.g., voice communications) may work better on a 3G network rather than an LTE network. In other aspects, some applications (e.g., applications that require lower bandwidth or data usage) may perform better on an earlier technology because of certain network conditions. For example, the first network technology may be lightly loaded with traffic while the second network, may be heavily loaded. In some aspects, the first network may have better latency which allows the application or communication to perform better on the first network technology that has a lower throughput than the second network technology (e.g., LTE). In these cases, the AT 106 may determine to switch to the first network technology (e.g., 1×, EVDO, GSM, etc.) from a second network technology (e.g., LTE).

When the AT 106 determines that there is a second network available and it is desirable to switch to the second network, the AT 106 may self-initiate a channel release by sending connection close command to force to idle state faster if the second coverage is sufficient. Once the AT 106 is back to idle state, the AT 106 can switch back to the second network through the normal eHRPD procedure or through the second network cell reselection procedure. In some embodiments, when the AT 106 is on the first network and determines that there is a second network available, and it is desirable to switch to the second network, the AT 106 may notify the first network by indicating the switch to the second network (e.g., LTE) in a Release Order Message. In some embodiments, when the AT 106 is on a first network and determines that there is second network available and it is desirable to switch to the second network, the AT 106 may notify the first network by indicating the switch to the second network in a CloseConnection Message.

Figure 5:
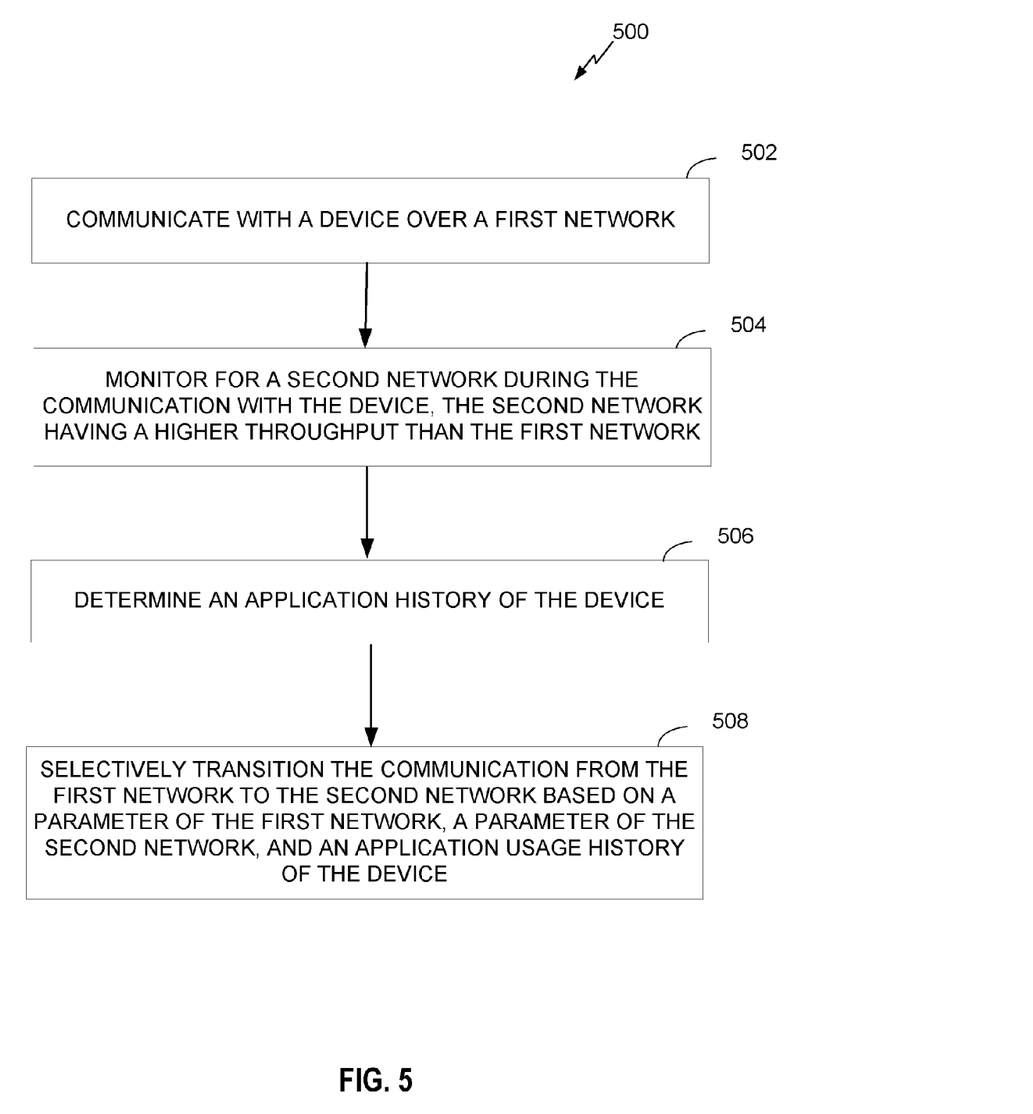
FIG. 5 shows a flowchart of an exemplary method for wireless communication that may be employed within the wireless communication network of FIG. 1.

FIG. 5 shows a flowchart 500 of an exemplary method for wireless communication that may be employed within the wireless communication network of FIG. 1. In one implementation, one or more of the steps in flowchart 500 may be performed by, or in connection with, a wireless device, a processor, receiver and/or transmitter, such as the wireless device 202, processor 204, the receiver 212 or the transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

The method 500 includes block 502, which includes communicating with a device over a first network. The first network may be any type of cellular next work including, but not limited to, a CDMA 1× network, an EVDO network, a 2G network, a 3G network, a 4G network or an LTE network.

The method 500 further includes block 504, which includes monitoring for a second network during the communication with the device, the second network having a higher throughput than the first network. For example, the second network may be any type of cellular next work including, but not limited to, a CDMA 1× network, an EVDO network, a 2G network, a 3G network, a 4G network or an LTE network that has a higher throughput than the first network. The method 500 further includes block 506, which includes determining an application history of the device. The method 500 further includes block 508, which includes selectively transitioning the communication from the first network to the second network based on a parameter of the first network, a parameter of the second network, and an application usage history of the device.

Figure 6:
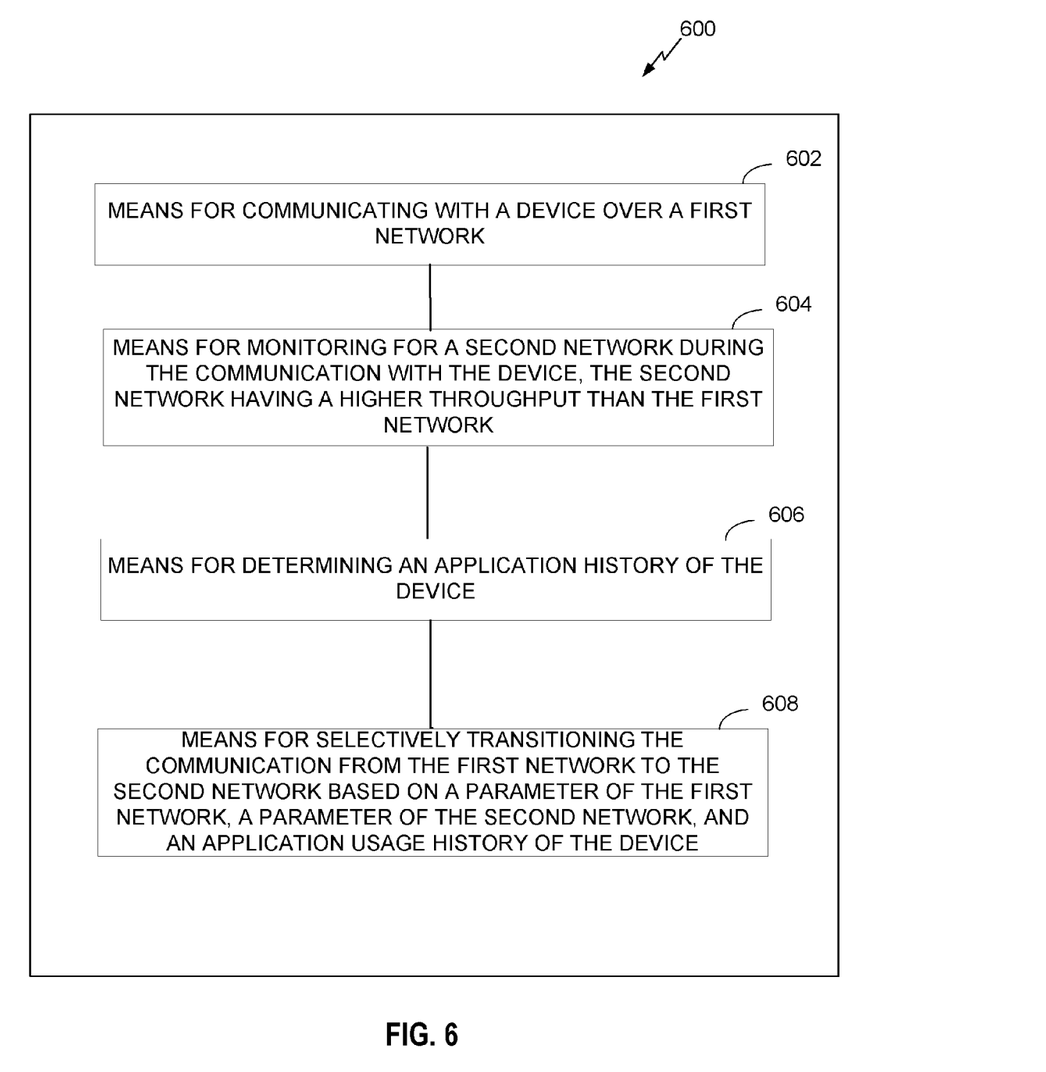
FIG. 6 illustrates an example of a functional block diagram of an apparatus for wireless communication that may be employed within the wireless communication network of FIG. 1.

FIG. 6 illustrates an example of a functional block diagram 600 of an apparatus for wireless communication that may be employed within the wireless communication network of FIG. 1. Those skilled in the art will appreciate that an apparatus for wireless communication may have more components than the simplified networked communication apparatus 600 shown in FIG. 6. The wireless power apparatus 600 shown includes only those components useful for describing some prominent features of implementations within the scope of the claims.

The wireless power apparatus 600 includes means 602 for communicating with a device over a first network. In some implementations, the means 602 may be configured to perform one or more of the functions described above with respect to block 502 (FIG. 5). In various implementations, the means 602 may be implemented by the transceiver 214 of FIG. 2.

The wireless power apparatus 600 may further include means 604 for monitoring for a second network during the communication with the device, the second network having a higher throughput than the first network. In an implementation, the means 604 may be configured to perform one or more of the functions described above with respect to block 504 (FIG. 5). In various implementations, the means 604 may be implemented by the transceiver 214 of FIG. 2.

The wireless power apparatus 600 may further include means 606 for determining an application history of the device. In an implementation, the means 604 may be configured to perform one or more of the functions described above with respect to block 506 (FIG. 5). In various implementations, the means 606 may be implemented by the processor 204 or DSP 220 of FIG. 2.

The wireless power apparatus 600 may further include means 608 for selectively transitioning the communication from the first network to the second network based on a parameter of the first network, a parameter of the second network, and an application usage history of the device. In an implementation, the means 608 may be configured to perform one or more of the functions described above with respect to block 508 (FIG. 5). In various implementations, the means 608 may be implemented by the processor 204 or DSP 220 of FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
   a first antenna configured to communicate with a device over a first network utilizing a first radio technology;
   a second antenna configured to monitor for a second network during the communication with the device according to a first periodicity, the first periodicity being determined based on at least one of a variable time offset and a characteristic of the first radio technology, the second network having a higher throughput than the first network; and
   a processor coupled to the first antenna and the second antenna, the processor configured to:
      determine an application usage history of the device;
      selectively transition the communication from the first network to the second network based on a parameter of the first network, a parameter of the second network, the application usage history of the device, and a threshold application usage history of the device associated with the first network;
   wherein the second antenna is further configured to tune to a third network according to a second periodicity, the second antenna being further configured to monitor for a second network according to a third periodicity, the third periodicity being offset from the second periodicity.

2. The apparatus of claim 1, wherein the parameter of the first network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis.

3. The apparatus of claim 1, wherein the parameter of the second network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis.

4. The apparatus of claim 1, wherein the third periodicity is based on a radio technology of the first network, a signal strength of the second network, a battery level of the device, and/or a size of a multimode system selection (MMSS) preferred roaming list (PRL).

5. The apparatus of claim 1, wherein the first antenna is further configured to monitor for the second network according to the third periodicity when the second antenna power satisfies a threshold or when a signal difference between the first antenna and the second antenna satisfies a threshold.

6. The apparatus of claim 1, wherein the processor is further configured to selectively transition the communication from the second network to the first network based on a parameter of the first network, a parameter of the second network, and the application usage history of the device.

7. The apparatus of claim 6, wherein the parameter of the first network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, or a hysteresis, the parameter of the second network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis, and the application usage history comprises a download throughput requirement, and/or an upload throughput requirement.

8. A method for wireless communication, comprising:
communicating with a device over a first network utilizing a first radio technology;
monitoring, by a processor, for a second network during the communication with the device according to a first periodicity, the first periodicity being determined based on at least one of a variable time offset and a characteristic of the first radio technology, the second network having a higher throughput than the first network;
determining, by the processor, an application usage history of the device;
selectively transitioning the communication from the first network to the second network based on a parameter of the first network, a parameter of the second network, the application usage history of the device, and a threshold application usage history of the device associated with the first network; and
tuning to a third network according to a second periodicity, wherein monitoring for a second network comprises monitoring for a second network according to a third periodicity, the third periodicity being offset from the second periodicity.

9. The method of claim 8, wherein the threshold application usage history comprises one or more thresholds based on the throughput of the first network, and wherein selectively transitioning comprises selectively transitioning the communication from the first network to the second network when the application usage history satisfies the one or more thresholds.

10. The method of claim 8, wherein the parameter of the first network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis.

11. The method of claim 8, wherein the parameter of the second network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis.

12. The method of claim 8, wherein the third periodicity is based on the first radio technology, a signal strength of the second network, a battery level of the device, and/or a size of a multimode system selection (MMSS) preferred roaming list (PRL).

13. The method of claim 8, further comprising selectively transitioning the communication from the second network to the first network based on a parameter of the first network, a parameter of the second network, and the application usage history of the device.

14. The method of claim 13, wherein the parameter of the first network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, or a hysteresis, the parameter of the second network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis, and the application usage history comprises a download throughput requirement and/or an upload throughput requirement.

15. An apparatus for wireless communication, the apparatus comprising:
means for communicating with a device over a first network utilizing a first radio technology;
means for monitoring for a second network during the communication with the device according to a first periodicity, the first periodicity being determined based on at least one of a variable time offset and a characteristic of the first radio technology, the second network having a higher throughput than the first network;
means for determining an application usage history of the device;
means for selectively transitioning the communication from the first network to the second network based on a parameter of the first network, a parameter of the second network, the application usage history of the device, and a threshold application usage history of the device associated with the first network and means for tuning to a third network according to a second periodicity, the monitoring means comprising means for monitoring for a second network according to a third periodicity, the third periodicity being offset from the second periodicity.

16. The apparatus of claim 15, wherein means for communicating comprises an antenna, wherein the means for monitoring comprises an antenna, wherein the means for determining comprises a processor, wherein the means for selectively transitioning comprises a processor.

17. The apparatus of claim 15, wherein the parameter of the first network or the parameter of the second network comprises a radio technology, a reference signal received power (RSRP), a reference signal received quality (RSRQ), a received signal strength indicator (RSSI), a traffic load, a signal-to-interference-plus-noise-ratio (SINR), a throughput, an estimated throughput, a latency, and/or a hysteresis.

18. The apparatus of claim 15, wherein the third periodicity is based on the first radio technology, a signal strength of the second network, a battery level of the device, and/or a size of a multimode system selection (MMSS) preferred roaming list (PRL).

19. The apparatus of claim 15, further comprising means for selectively transitioning the communication from the second network to the first network based on a parameter of the first network, a parameter of the second network, and the application usage history of the device.

20. The apparatus of claim 19, wherein means for selectively transitioning the communication from the second network to the first network comprises means for selectively transitioning from the second network to the first network when the application usage history indicates that the application performs better on the first network than on the second network.

21. A non-transitory computer-readable medium comprising code that, when executed causes an apparatus for wireless communication to:
  communicate with a device over a first network utilizing a first radio technology;
  monitor for a second network during the communication with the device according to a first periodicity, the first periodicity being determined based On at least one of a variable time offset and a characteristic of the first radio technology, the second network having a higher throughput than the first network;
  determine an application usage history of the device; and
  selectively transition the communication from the first network to the second network based on a parameter of the first network, a parameter of the second network, the application usage history of the device, and a threshold application usage history of the device associated with the first network; and
  tune to a third network according to a second periodicity, the second antenna being further configured to monitor for a second network according to a third periodicity, the third periodicity being offset from the second periodicity.

22. The non-transitory computer-readable medium of claim 21, wherein the code, when executed, causes the apparatus to selectively transition the communication from the second network to the first network based on a parameter of the first network, a parameter of the second network, and the application usage history of the device.

* * * * *